US012775973B2

(12) United States Patent
Li

(10) Patent No.: US 12,775,973 B2
(45) Date of Patent: Oct. 27, 2026

(54) EQUIPMENT RECOMMENDATION METHOD, ELECTRONIC DEVICE AND NON-TRANSITORY COMPUTER READABLE RECORDING MEDIUM

(71) Applicant: Wistron Corporation, New Taipei City (TW)

(72) Inventor: Chun-Hsien Li, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 622 days.

(21) Appl. No.: 18/318,734

(22) Filed: May 17, 2023

(65) Prior Publication Data

US 2024/0311894 A1 Sep. 19, 2024

(30) Foreign Application Priority Data

Mar. 15, 2023 (TW) ................................ 112109631

(51) Int. Cl.
*G06Q 30/0601* (2023.01)

(52) U.S. Cl.
CPC ................................ *G06Q 30/0631* (2013.01)

(58) Field of Classification Search
CPC ......... G06Q 30/0631; G06Q 10/06313; G06Q 50/06; G06N 20/00
See application file for complete search history.

(56) References Cited

U.S. PATENT DOCUMENTS

| | | | | |
|---|---|---|---|---|
| 8,306,928 | B2 | 11/2012 | Chu et al. | |
| 2010/0152878 | A1 | 6/2010 | Chu et al. | |
| 2011/0126206 | A1* | 5/2011 | Kato | G06F 9/5094 718/103 |
| 2023/0037305 | A1* | 2/2023 | Amoudi | G06Q 10/06 |
| 2024/0049088 | A1* | 2/2024 | Abedini | H04W 48/16 |

FOREIGN PATENT DOCUMENTS

| | | | | |
|---|---|---|---|---|
| CN | 115390948 A | * 11/2022 | G06F 9/44594 |
| CN | 115586747 | 1/2023 | |
| CN | 112901449 B | * 3/2023 | F04B 37/12 |
| CN | 117669860 A | * 3/2024 | G06N 3/0442 |
| TW | 515967 | 1/2003 | |
| TW | 201024945 | 7/2010 | |

* cited by examiner

*Primary Examiner* — Scott T Baderman
(74) *Attorney, Agent, or Firm* — JCIPRNET

(57) ABSTRACT

An equipment recommendation method, an electronic device and a non-transitory computer readable recording medium are provided. A plurality of feature variables of each of equipment are obtained according to equipment operation information of the equipment. Idling data of each of the equipment is obtained according to an idling state prediction model and the feature variables of each of the equipment. A plurality of energy efficiency indexes of each of the equipment are calculated according to the equipment operation information of each of the equipment. A suggested used rank of each of the equipment is determined according to the plurality of energy efficiency indexes and the idling data of each of the equipment. Suggestion information related to the suggested used rank of each of the equipment is displayed via a display.

18 Claims, 6 Drawing Sheets

EQUIPMENT RECOMMENDATION METHOD, ELECTRONIC DEVICE AND NON-TRANSITORY COMPUTER READABLE RECORDING MEDIUM

CROSS-REFERENCE TO RELATED APPLICATION

This application claims the priority benefit of Taiwan application no. 112109631, filed on Mar. 15, 2023. The entirety of the above-mentioned patent application is hereby incorporated by reference herein and made a part of this specification.

BACKGROUND

Technical Field

The disclosure relates to an energy-saving method, and particularly relates to an equipment recommendation method, an electronic device and a non-transitory computer readable recording medium.

Description of Related Art

With the increasing importance of environmental protection issues such as greenhouse gas reduction, energy conservation, and carbon reduction, energy conservation has currently become one of the key development projects. If the cause of electricity waste can be effectively found and the suitable approach to energy conservation can be provided, it not only contributes to environmental protection, but also benefits factory costs and profits.

Electricity is required for operating equipment. Equipment with relatively low energy efficiency requires to consume relatively great electricity to reach the operating target, or even fail to operate normally, resulting in waste of electricity. Generally, most factories have multiple equipment, but not all equipment need to be turned on during a production process. Since each equipment has a different energy efficiency and equipment state, which equipment is selected by an equipment manager to be used affects electricity cost and production efficiency. However, a group control system for the equipment in factories currently cannot provide suggestions on a use rank of the equipment. In other words, it is not easy for the equipment manager to determine use priorities of the equipment, which may thus lead to an increase in electricity consumption and energy costs.

SUMMARY

The disclosure is directed to an equipment recommendation method and an electronic device and a non-transitory computer readable recording medium.

An embodiment of the disclosure provides an equipment recommendation method including following steps. A plurality of feature variables of each of a plurality of equipment are generated according to equipment operation information of the plurality of equipment. Idling data of each of the plurality of equipment is obtained according to the feature variables of each of the plurality of equipment and an idling state prediction model. A plurality of energy efficiency indexes of each of the plurality of equipment are calculated according to the equipment operation information of each of the plurality of equipment. A suggested use rank of each of the plurality of equipment is determined according to the energy efficiency indexes and the idling data of each of the plurality of equipment. Suggestion information associated with the suggested use rank of each of the plurality of equipment is displayed via a display.

An embodiment of the disclosure provides an electronic device including a display, a storage circuit and a processor. The storage circuit stores a plurality of instructions. The processor is coupled to the display and the storage circuit, and accesses the instructions and is configured to execute the following steps. A plurality of feature variables of each of a plurality of equipment are generated according to equipment operation information of the plurality of equipment. Idling data of each of the plurality of equipment is obtained according to the feature variables of each of the plurality of equipment and an idling state prediction model. A plurality of energy efficiency indexes of each of the plurality of equipment are calculated according to the equipment operation information of each of the plurality of equipment. A suggested use rank of each of the plurality of equipment is determined according to the energy efficiency indexes and the idling data of each of the plurality of equipment. Suggestion information associated with the suggested use rank of each of the plurality of equipment is displayed via a display.

An embodiment of the disclosure provides a computer readable recording medium storing a program, and when a computer loads and executes the program, the computer completes the above-mentioned equipment recommendation method.

Based on the above description, in the embodiment of the disclosure, the idling data of each equipment may be obtained according to the equipment operation information of multiple equipment and the trained machine learning model, and the suggested use rank of each equipment may be determined according to the idling data of each equipment. Since the suggested use rank of each equipment is generated with consideration of the idling data, the use ranks of the equipment may be effectively optimized for the purpose of energy saving.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Some embodiments of the disclosure will be described in detail with reference to the accompanying drawings. For the referenced element symbols in the following description, when the same element symbols appear in different drawings, they will be regarded as the same or similar elements. These embodiments are only a part of the disclosure, and do not reveal all possible implementation modes of the disclosure. Rather, these embodiments are merely examples of devices and methods within the claims of the disclosure.

Figure 1:
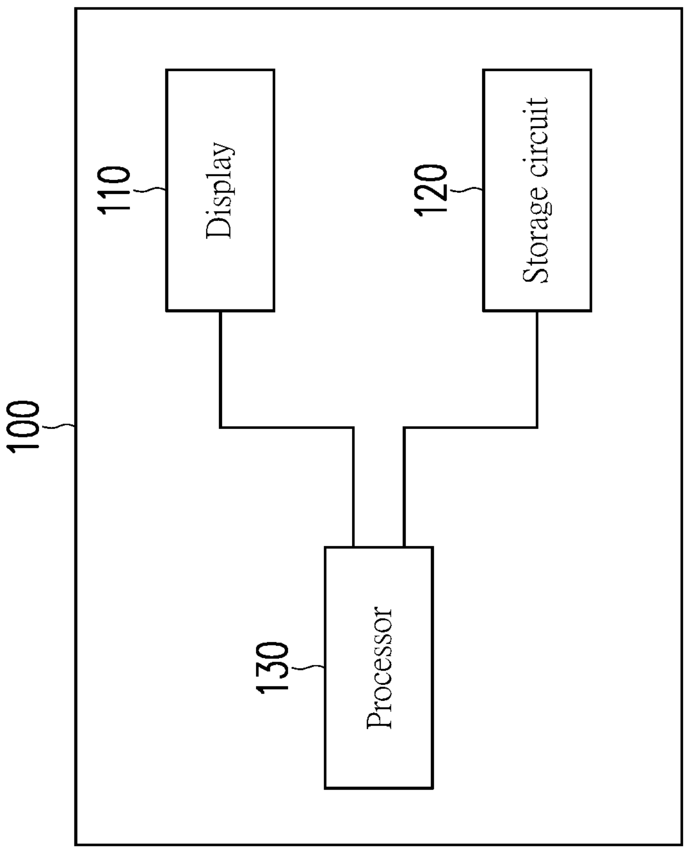
FIG. 1 is a schematic diagram of an electronic device according to an embodiment of the disclosure.

Referring to FIG. 1, FIG. 1 is a schematic diagram of an electronic device according to an embodiment of the disclosure. In different embodiments, an electronic device 100 is, for example, a computer device such as a notebook computer, a desktop computer, a server, and a workstation, etc., with computing capabilities, but the disclosure is not limited thereto. The electronic device 100 may include a display 110, a storage circuit 120, and a processor 130.

The display 110 is, for example, various types of display such as a liquid crystal display (LCD), a light emitting diode (LED) display, an organic light emitting diode (OLED) display, etc., that is built in the electronic device 100, but the disclosure is not limited thereto. In other embodiments, the display 110 may also be any display device externally connected to the electronic device 100.

The storage circuit 120 is, for example, any type of a fixed or removable random access memory (RAM), a read-only memory (ROM), a flash memory, a hard disk or other similar device, or a combination of these devices, which may be used to record a plurality of instructions, program codes, or software modules.

The processor 130 is, for example, a central processing unit (central processing unit (CPU), an application processor (AP), or other programmable general purpose or special purpose microprocessor, digital signal processor (DSP), image signal processor (ISP), graphics processing unit (GPU) or other similar devices, integrated circuits and combinations thereof. The processor 130 may access and execute software modules recorded in the storage circuit 120 to implement the equipment recommendation method of the embodiment of the disclosure. The above-mentioned software modules may be broadly interpreted as meaning instructions, instruction sets, codes, program codes, programs, applications, software packages, threads, procedures, functions, etc., regardless of whether they are referred to as software, firmware, intermediate software, microcode, hardware description languages, or others.

Figure 2:
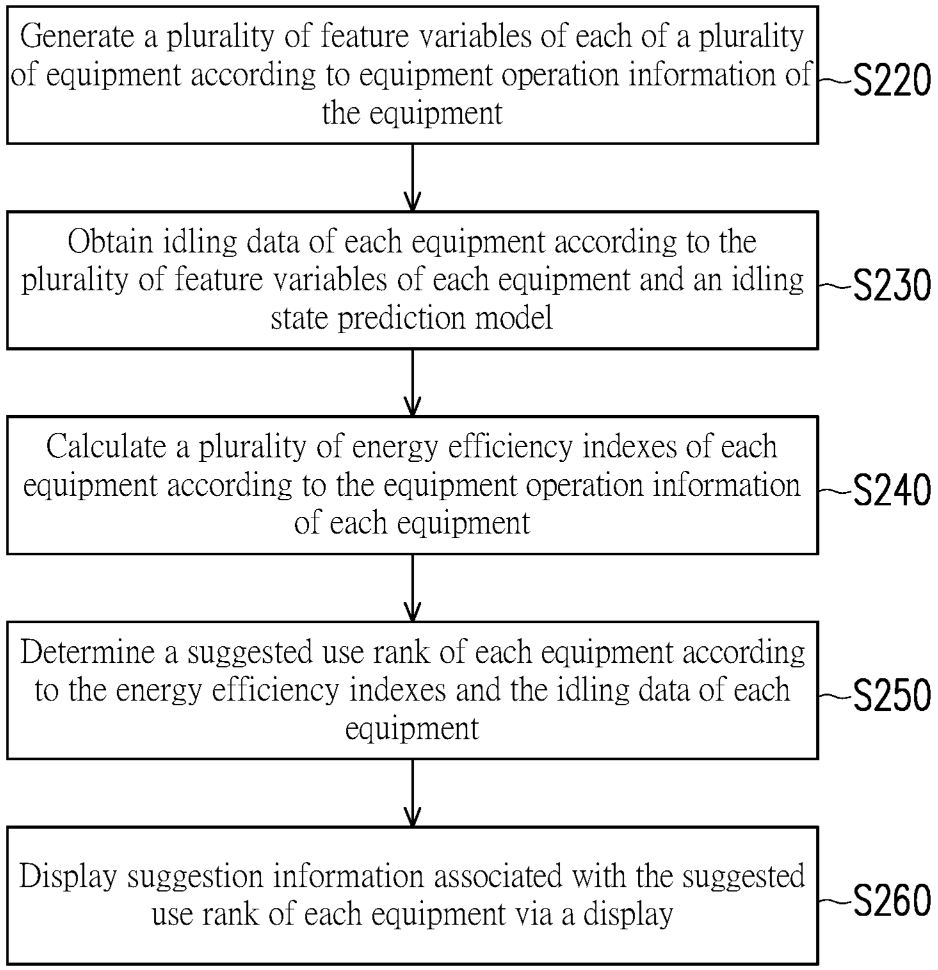
FIG. 2 is a flowchart of an equipment recommendation method according to an embodiment of the disclosure.

FIG. 2 is a flowchart of an equipment recommendation method according to an embodiment of the disclosure. Referring to FIG. 1 and FIG. 2, the method of the embodiment is applicable to the electronic device 100 of the above-mentioned embodiment, and detailed steps of the equipment recommendation method of the embodiment will be described below with reference of various components in the electronic device 100.

In some embodiments, the processor 130 may obtain equipment operation information of a plurality of equipment. In some embodiments, the equipment may be various machinery equipment in a factory, such as production equipment, air compressors or air-conditioning equipment, etc. The equipment operation information of the equipment may include power consumption data, equipment status data or equipment output data, etc. The equipment operation information of the equipment may be obtained by sensors or measuring instruments by performing sensing and measurement operations. The above-mentioned sensors or measuring instruments may include electric meters, thermometers, hygrometers, pressure gauges, etc., which is not limited by the disclosure. Alternatively, the equipment operation information of the equipment may be obtained from a product production plan or a factory production log recorded in the storage circuit 120. The electronic device 100 may generate suggested use ranks for the plurality of equipment providing a same function, but specifications and models of these equipment may be the same or different. For example, these equipment may be one or more types of air compressors.

In step S220, the processor 130 may generate a plurality of feature variables of each of the equipment according to the equipment operation information of the plurality of equipment. It should be noted that these feature variables are feature variables associated with equipment idling. Equipment idling represents a state that the equipment is not loaded but still consumes electricity. For example, if these equipment are air compressors, an operating state that an air storage chamber of the air compressor has sufficient pressure or no air is output but a motor continues to run may be referred to as an idling state. If these equipment are production equipment, an operating state that no products are produced but the components of the production equipment are still in continuous operation may be referred to as the idling state. If these equipment are air-conditioning equipment, an operating state that the components of the air-conditioning equipment continue to operate while a temperature is at a setting temperature may be referred to as the idling state.

In an embodiment, these equipment are air compressors, and the plurality of feature variables of each equipment may include a displacement volume, a displacement pressure, a displacement temperature, electricity consumption per unit time, an equipment rated power, a ratio of electricity consumption per unit time to equipment rated power, a ratio of displacement volume to expected displacement volume, a ratio of temperature to setting temperature, and/or a ratio of pressure to setting pressure.

In an embodiment, these equipment are air-conditioning equipment, and the plurality of feature variables of each equipment may include a cooling capacity, electricity consumption of cooling water tower, an indoor temperature, electricity consumption per unit time of air-conditioning equipment, electricity consumption per unit time of cooling water tower, rated power of air air-conditioning equipment, rated power of cooling water tower, a ratio of electricity consumption per unit time of air-conditioning equipment to rated power of air-conditioning equipment, a ratio of indoor temperature to setting temperature, and/or a ratio of electricity consumption per unit time of cooling water tower to rated power of cooling water tower.

In an embodiment, these equipment are production equipment, and the plurality of feature variables of each equipment may include a product actual output, a product target output, electricity consumption per unit time of production equipment, rated power of production equipment, a ratio of electricity consumption per unit time of production equipment to rated power of production equipment, and/or a ratio of product actual output to product target output.

In step S230, the processor 130 may obtain idling data of each equipment according to the plurality of feature variables of each equipment and an idling state prediction model. The idling state prediction model is a machine learning model. The idling state prediction model may generate a predicted idling state of the equipment according to the input feature variables, and the predicted idling state may be an idling state or a non-idling state. The processor 130 may input the feature variables of each equipment corresponding to a certain unit time period into the idling state prediction model to generate the predicted idling state. Thereafter, taking a certain equipment as an example, the processor 130 may generate the idling data of the equipment according to at least one predicted idling state corresponding to at least one unit time period.

In more detail, the processor 130 may establish the idling state prediction model based on the equipment operation information of the equipment, and the idling state prediction model trained based on a machine learning algorithm may be recorded in the storage circuit 120. In other words, the processor 130 may perform machine learning by taking the equipment operation information of a past period of time as a training data set to create a machine learning model for identifying whether the equipment is operating in the idling state or the non-idling state according to the input feature variables.

In some embodiments, the idling data may include an idling rate. In some embodiments, the processor 130 may input a plurality of feature variables corresponding to a plurality of unit time periods into the idling state prediction model, so as to obtain a plurality of predicted idling states corresponding to the plurality of unit time periods. Namely, the idling state prediction model is a classification model in the machine learning model. Thereafter, the processor 130 may calculate the idling rate of each equipment according to the plurality of predicted idling states corresponding to the plurality of unit time periods. A time length of the unit time period may be one day, half a day, one hour or 30 minutes, etc., which is not limited in the disclosure.

Further, in some embodiments, the processor 130 may calculate an idling time in a statistical time period according to the plurality of predicted idling states corresponding to the plurality of unit time periods in the statistical time period. The idling time represents a total time length that the equipment is operated in the idling state during the statistical time period. Thereafter, the processor 130 may calculate the idling rate according to the idling time and the statistical time period. The statistical time period may be one week, three days, one day or half a day, etc., which is not limited in the disclosure.

For example, taking the time length of the unit time period as one hour as an example, the processor 130 may input multiple feature variables of each hour of the past day (i.e., the statistical time period) into the idling state prediction model to obtain 24 predicted idling states corresponding to 24 hours. It is assumed that the 24 predicted idling states include 4 idling states and 20 non-idling states, the processor 130 may calculate the idling rate as 4/24=0.1667. The processor 130 may calculate the idling rate of each equipment in the similar manner.

Then, in step S240, the processor 130 calculates a plurality of energy efficiency indexes of each equipment according to the equipment operation information of each equipment. These energy efficiency indexes of each equipment may include an equipment energy efficiency, an output compliance rate, and/or an equipment availability, etc.

In some embodiments, the processor 130 may determine an equipment energy efficiency of the equipment according to the equipment operation information. The equipment energy efficiency of the equipment may represent an equipment operating efficiency under a unit electricity consumption. In some embodiments, the processor 130 obtains at least one output data of the equipment from the equipment operation information, and determines the equipment energy efficiency according to a ratio of the at least one output data to an electricity consumption of the equipment. The processor 130 may check the equipment energy efficiency of the equipment every unit time period according to the equipment operation information of the equipment. A time length of the unit time period may be one week, one day, one hour or one minute, etc., which is not limited in the disclosure.

In some embodiments, the output data may be generated by sensors or measuring instruments on the equipment. In some embodiments, the output data may be generated by sensors or measuring instruments deployed in the factory. In some embodiments, the output data may be determined according to data in a product production plan.

In some embodiments, the equipment energy efficiency of the equipment is a parameter value determined according to the output data and the power consumption of the equipment. The output data is determined according to a type of the equipment. For example, it is assumed that the equipment is an air compressor, the processor 130 may calculate a displacement volume produced by the air compressor using the unit electricity consumption to obtain the equipment energy efficiency of the air compressor. For example, the equipment energy efficiency of the air compressor may be the displacement volume per hour divided by the electricity consumption of that hour. It is assumed that the equipment is a production equipment, the processor 130 may calculate a product production output produced by the production equipment using the unit electricity consumption to obtain the equipment energy efficiency of the production equipment. For example, the equipment energy efficiency of the production equipment may be the product production output per hour divided by the electricity consumption of that hour. It is assumed that the equipment is an air-conditioning equipment, the processor 130 may calculate an indoor-outdoor temperature difference caused by the air-conditioning equipment using the unit electricity consumption to obtain the equipment energy efficiency of the air-conditioning equipment. For example, the equipment energy efficiency of the air-conditioning equipment may be the indoor-outdoor temperature difference of each hour divided by the electricity consumption of that hour.

In some embodiments, the processor 130 may obtain an output compliance rate according to the output data of each unit time period (for example, each hour) in a past period of time (for example, 6 months). For example, it is assumed that the equipment is an air compressor, by dividing an actual displacement volume of the unit time period by an average displacement volume of the displacement volume per unit time period in the past 6 months, the processor 130 may obtain the output compliance rate of a certain air compressor. For example, it is assumed that the equipment is an air-conditioning equipment, by dividing an actual cooling capacity of a unit time period by an average cooling capacity of the cooling capacity per unit period in the past 6 months, the processor 130 may obtain the output compliance rate of a certain air-conditioning equipment. For example, it is assumed the equipment is a production equipment, by dividing an actual output of a unit time period by an average output of the output per unit time period in the past 6 months, the processor 130 may obtain the output compliance rate of a certain production equipment.

In some embodiments, equipment availability is an important index used to measure an equipment utilization rate, which is a percentage of an actual working time and a planned working time (i.e., a load time). The processor 130 may calculate the equipment availabilities of various equipment according to a following equation (1). Equation (1): equipment availability=(maximum use time−equipment downtime−production line downtime)/(maximum use time−equipment downtime).

In step S250, the processor 130 may determine a suggested use rank of each equipment according to multiple energy efficiency indexes and idling data of each equipment. In some embodiments, by inputting a plurality of energy efficiency indexes and idling data of each equipment into a machine learning model, the processor 130 may determine the suggested use rank of each equipment. In some embodiments, by sorting the plurality of energy efficiency indexes and idling data of each equipment, the processor 130 may determine the suggested use rank of each equipment. Therefore, in addition to the plurality of energy efficiency indexes, the processor 130 further considers the idling data of each equipment to determine the suggested use rank of each equipment. For example, it is assumed that there are 4 air compressors, the processor 130 may acquire the suggested use rank corresponding to each of the 4 air compressors. The suggested use rank may also be regarded as a recommended ranking. In the case of considering the idling data to determine the priority use rank of each equipment, a further energy-saving effect may be achieved.

In step S260, the processor 130 may display suggestion information associated with the suggested use rank of each equipment through the display 110. Namely, the processor 130 may provide suggestion information associated with the suggested use rank through the display 110, so that an equipment manager may decide which equipment to use according to the suggestion information associated with the suggested use rank. In some embodiments, the suggestion information may include the suggested use rank of each equipment. In some embodiments, the suggestion information may include benefit comparison results of the suggested use rank of each equipment and other reference use ranks. In some embodiments, the suggestion information may include a final use rank of each equipment, and the final use rank is selected from the suggested use rank and other reference use ranks. In this way, the equipment manager of the factory may avoid using equipment with high idling rate to reduce energy waste.

Figure 3:
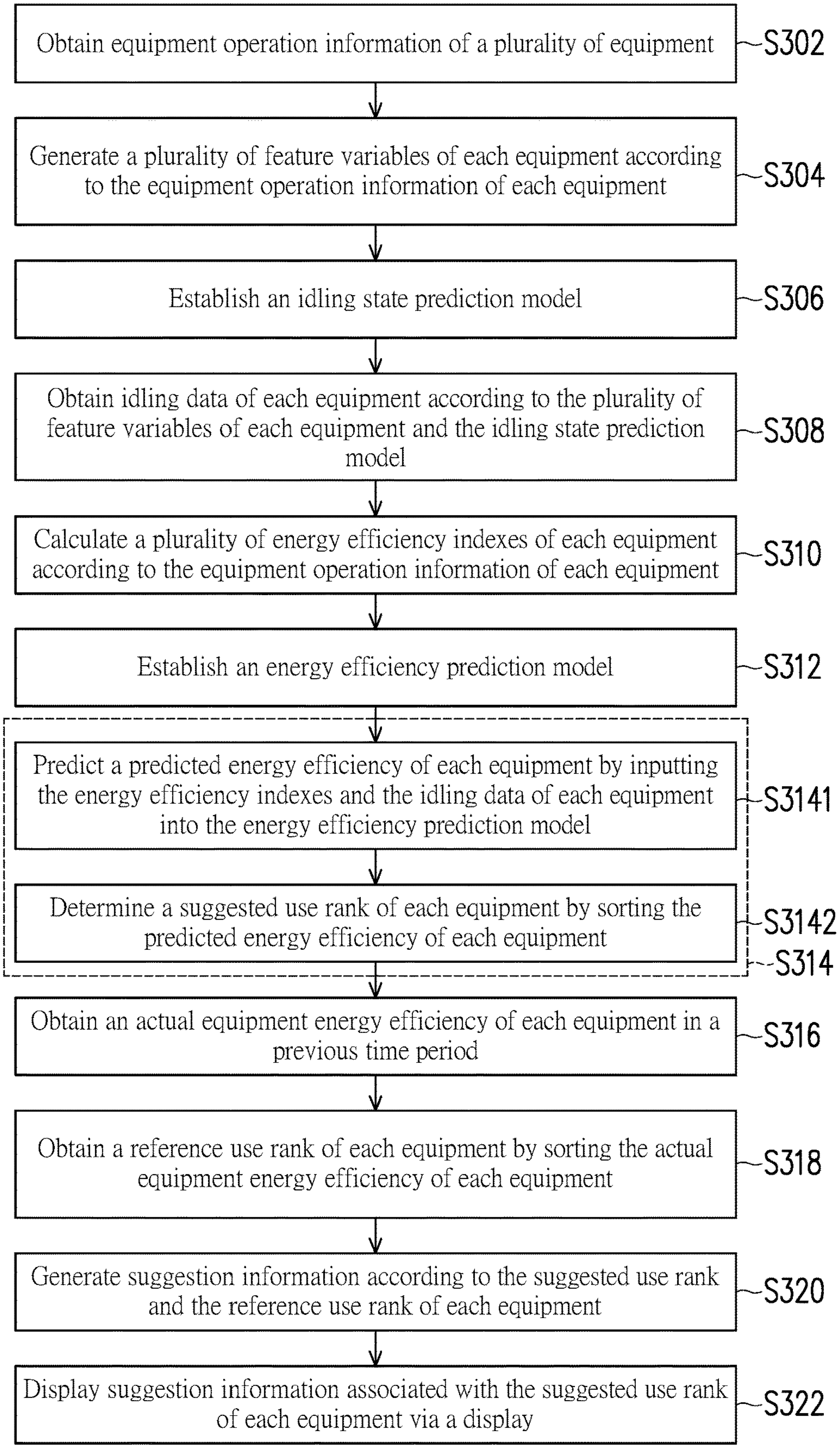
FIG. 3 is a flowchart of an equipment recommendation method according to an embodiment of the disclosure.

FIG. 3 is a flowchart of an equipment recommendation method according to an embodiment of the disclosure. Referring to FIG. 1 and FIG. 3, the method of the embodiment is applicable to the electronic device 100 in the above-mentioned embodiment, and detailed steps of the equipment recommendation method in the embodiment will be described below with reference of various components in the electronic device 100.

In step S302, the processor 130 may obtain equipment operation information of a plurality of equipment. In step S304, the processor 130 may generate a plurality of feature variables of each equipment according to the equipment operation information of each equipment. For detailed operations of step S302 to step S304, reference may be made to the description of the embodiment in FIG. 2, and details thereof are not repeated here.

Figure 4:
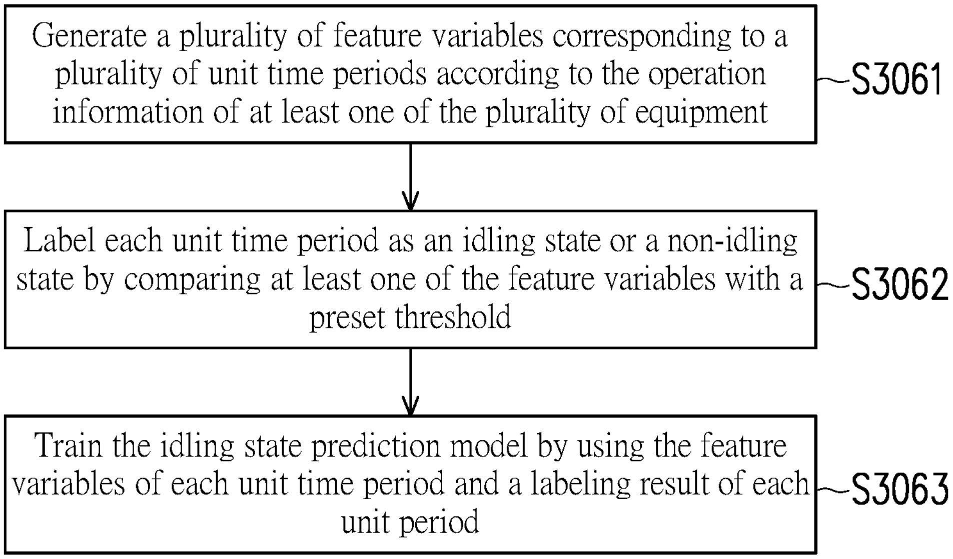
FIG. 4 is a flowchart of establishing an idling state prediction model according to an embodiment of the disclosure.

In step S306, the processor 130 may establish an idling state prediction model. It should be noted that the disclosure does not limit a training timing of the idling state prediction model, and the sequence of steps shown in FIG. 3 is only for demonstration. The idling state prediction model only needs to be established before it is applied to predict a predicted idling state of the equipment. Referring to FIG. 4, FIG. 4 is a flowchart of establishing an idling state prediction model according to an embodiment of the disclosure. In the embodiment of FIG. 4, step S306 may be implemented as step S3061 to step S3063.

In step S3061, the processor 130 may generate a plurality of feature variables corresponding to a plurality of unit time periods according to the operation information of at least one of the plurality of equipment. The processor 130 may use the feature variables of one or more equipment to train the idling state prediction model. Specifically, the processor 130 may use multiple feature variables of a certain equipment in multiple unit time periods in a past period of time as training data, and these feature variables are input information of the idling state prediction model. For example, taking air compressor as an example, the processor 130 may calculate multiple feature variables of each hour in the past three months, and these feature variables include a displacement volume, a displacement pressure, a displacement temperature, and electricity consumption per unit time, an equipment rated power, a ratio of electricity consumption per unit time to equipment rated power, a ratio of displacement volume to expected displacement volume, a ratio of temperature to setting temperature, a ratio of pressure to setting pressure or a combination thereof.

In step S3062, the processor 130 may label each unit time period as an idling state or a non-idling state by comparing at least one of the feature variables with a preset threshold. Specifically, by comparing at least one of the feature variables with the preset threshold, the processor 130 may identify the unit time periods during which the equipment operates in the idling state. Namely, in some embodiments, this step may obtain labeled solution information required for training the idling state prediction model. Where, different feature variables may correspond to different preset thresholds.

In some embodiments, when a first feature variable in the feature variables of a certain unit time period is greater than a first preset threshold and a second feature variable in the feature variables of the unit time period is smaller than a second preset threshold, the processor 130 may label the unit time period as the idling state. When the first feature variable in the feature variables of a certain unit time period is not greater than the first preset threshold or the second feature variable in the feature variables of the unit time period is not smaller than the second preset threshold, the processor 130 may label the unit time period as the non-idling state. For example, when the electricity consumption per unit time of a certain hour (for example, 14:00-15:00 on January 2) in the past three months is greater than the first preset threshold and a ratio of the displacement volume to the expected displacement volume of this hour is less than the second preset threshold, the processor 130 may label the hour as the idling state. In this way, the processor 130 may label each hour in the past period of time as the idling state or the non-idling state.

Therefore, in step S3063, the processor 130 may use the feature variables of each unit time period and the labeling result of each unit period to train the idling state prediction model. The machine learning algorithm for training the idling state prediction model may include but not limited to one-class support vector machine (one-class SVM) and/or K-mean clustering. However, the disclosure does not limit the machine learning algorithm used for training the idling state prediction model, which may be set according to actual applications. In some embodiments, the processor 130 may use various machine learning algorithms to train a plurality of candidate models, and select a final idling state prediction model according to accuracies of these candidate models.

For example, the processor 130 may establish an idling state prediction model according to the equipment operation information of one or more equipment in January. After January is over, the processor 130 may use the idling state prediction model to generate a predicted idling state of the equipment for each hour according to the equipment operation information of each hour. For example, the processor 130 may extract a plurality of feature variables corresponding to "14:00-15:00, February 1st" from the equipment operation information of a certain equipment, and input these feature variables into the idling state prediction model, and the idling state prediction model outputs a predicted idling state corresponding to 15:00 on February 1st.

In step S308, the processor 130 may acquire idling data of each equipment according to the plurality of feature variables of each equipment and the idling state prediction model. In step S310, the processor 130 may calculate a plurality of energy efficiency indexes of each equipment according to the equipment operation information of each equipment. For detailed operations of step S308 to step S310, reference may be made to the description of step S230 and step S240 in the embodiment of FIG. 2, and details thereof are not repeated here.

In step S312, the processor 130 may establish an energy efficiency prediction model. It should be noted that the disclosure does not limit a training timing of the energy efficiency prediction model, and the sequence of steps shown in FIG. 3 is only for demonstration. The energy efficiency prediction model only needs to be established before it is applied to predict a predicted energy efficiency of the equipment. Since the electricity consumption per unit time and the output data per unit time period of the equipment in the past period of time are known, the equipment energy efficiency of the equipment per unit time period in the past period of time is also known. In this case, the processor 130 may use the equipment energy efficiency of a certain historical unit time period as solution information for model training, and use the energy efficiency index and idling data of a historical time period calculated backward from the historical unit time period as model input information, so as to train the energy efficiency prediction model according to the machine learning algorithm.

For example, the processor 130 may use the equipment energy efficiency of "January 31st 14:00-15:00" as the solution information for model training, and use an energy efficiency average, an output compliance rate and an idling rate (idling data) of a historical period of one week "January 24 to January 30" calculated backward from "January 31st 14:00-15:00" as the model input information to train the energy efficiency prediction model based on the machine learning algorithm. The machine learning algorithm for training the energy efficiency prediction model may include but not limited to a linear regression algorithm, a random forest algorithm or a support vector regression (SVR) algorithm. However, the disclosure does not limit the machine learning algorithm used for training the energy efficiency prediction model, which may be set according to an actual application. Therefore, the energy efficiency prediction model may generate the predicted energy efficiency of a certain equipment according to the energy efficiency index and idling data of the equipment in a past period of time.

In step S314, the processor 130 may determine the suggested use rank of each equipment according to multiple energy efficiency indexes and idling data of each equipment. In the embodiment, step S314 may be implemented as step S3141 and step S3142.

In step S3141, the processor 130 may predict the predicted energy efficiency of each equipment by inputting a plurality of energy efficiency indexes and idling data of each equipment into the energy efficiency prediction model. Namely, regarding one equipment, multiple energy efficiency indexes and idling data relative to a current time may be combined into an input feature vector of the energy efficiency prediction model. For example, it is assumed that the current time is 15:xx, the processor 130 may calculate a plurality of energy efficiency indexes and idling data based on the equipment operation information of a historical time period of one week before 15:00, and combine these energy efficiency indexes and the idling data into the input feature vector of the energy efficiency prediction model. Correspondingly, the energy efficiency prediction model outputs the predicted energy efficiency corresponding to 15:00 for the equipment. The processor 130 may use the energy efficiency prediction model to perform prediction every one hour. For example, table 1 lists predicted energy efficiencies corresponding to multiple hours and previous hour actual equipment energy efficiencies corresponding to multiple hours of a certain equipment. In addition, the processor 130 may perform the same operation on each equipment to obtain the predicted energy efficiencies of each equipment.

TABLE 1

| Equipment | Unit time period | Previous hour actual equipment energy efficiency | Predicted energy efficiency |
|---|---|---|---|
| Equipment #1 | 15:00 | 10.2 | 10.1 |
| Equipment #1 | 16:00 | 10.0 | 10.9 |
| Equipment #1 | 17:00 | 10.9 | 10.1 |

Thereafter, in step S3142, the processor 130 may determine a suggested use rank of each equipment by sorting the predicted energy efficiency of each equipment. The processor 130 sorts the predicted energy efficiency of each equipment in a descending order, and uses a rank of the predicted energy efficiency of each equipment as a suggested use rank of each equipment. For example, table 2 lists the predicted energy efficiencies and suggested use ranks of 4 equipment.

Table 2

| Equipment | Unit time period | Predicted energy efficiency | Suggested use rank |
|---|---|---|---|
| Equipment #1 | 15:00 | 10.1 | 1 |
| Equipment #2 | 15:00 | 4.5 | 4 |
| Equipment #3 | 15:00 | 8.1 | 3 |
| Equipment #4 | 15:00 | 9.2 | 2 |

After obtaining the suggested use rank of each equipment, the processor 130 may generate suggestion information associated with the suggested use rank. In detail, in step S316, the processor 130 may acquire an actual equipment energy efficiency of each equipment in a previous time period. For example, the processor 130 may acquire an actual equipment energy efficiency of each equipment in a previous hour, i.e., divide the output data of the previous hour by the electricity consumption per unit time. Then, in step S318, the processor 130 may obtain a reference use rank of each equipment by sorting the actual equipment energy efficiency of each equipment. The processor 130 sorts the actual equipment energy efficiency of each equipment in a descending order, and use a rank of the actual equipment energy efficiency of each equipment as a reference use rank of each equipment. Namely, the reference use rank of each equipment may be determined by referring to the actual equipment energy efficiency in the previous hour. For example, table 3 lists the predicted energy efficiencies, suggested use ranks, previous hour actual equipment energy efficiencies and reference use ranks of 4 equipment.

TABLE 3

| Equipment | Unit time period | Predicted energy efficiency | Suggested use rank | Previous hour actual equipment energy efficiency | Reference use rank |
|---|---|---|---|---|---|
| Equipment #1 | 15:00 | 10.1 | 1 | 10.2 | 1 |
| Equipment #2 | 15:00 | 4.5 | 4 | 9.5 | 2 |
| Equipment #3 | 15:00 | 8.1 | 3 | 8.2 | 4 |
| Equipment #4 | 15:00 | 9.2 | 2 | 9.0 | 3 |

In step S320, the processor 130 may generate suggestion information according to the suggested use rank and the reference use rank of each device. The suggested information may include a final recommended use rank, and the final recommended use rank may be the reference use rank or the suggested use rank.

In some embodiments, the processor 130 may select the reference use rank or the suggested use rank as the final recommended use rank in the suggestion information according to a difference parameter between the actual equipment energy efficiency and the predicted energy efficiency of each equipment. When the difference parameter between the actual equipment energy efficiency and the predicted energy efficiency of each equipment is greater than a preset threshold value, it represents that a difference between the actual equipment energy efficiency of the previous hour and the predicted energy efficiency predicted by the energy efficiency prediction model according to the idling data is quite large, and the processor 130 may select the suggested use rank with consideration of the idling state as the final recommended use rank. On the contrary, when the difference parameter between the actual equipment energy efficiency and the predicted energy efficiency of each equipment is not greater than the preset threshold, the processor 130 may select the reference use rank as the final recommended use rank.

In some embodiments, the difference parameter between the actual equipment energy efficiency and the predicted energy efficiency of each equipment may be an average value of a rank index difference corresponding to each equipment. The rank index difference of a certain equipment is a rounding result of dividing the difference between the previous hour actual equipment energy efficiency and the predicted energy efficiency of the equipment by the previous hour actual equipment energy efficiency. Taking table 3 as an example to continue the description, the processor 130 may obtain the rank index differences as shown in table 4.

TABLE 4

| Equipment | Unit time period | Rank index difference |
|---|---|---|
| Equipment #1 | 15:00 | 0.01 = \|10.1-10.2\|/10.2 |
| Equipment #2 | 15:00 | 0.53 = \|4.5-9.5\|/9.5 |
| Equipment #3 | 15:00 | 0.01 = \|8.1-8.2\|/8.2 |
| Equipment #4 | 15:00 | 0.02 = \|9.2-9.0\|/9.0 |

Thereafter, the processor 130 may calculate an average value of the four rank index differences in table 4 as 0.14. It is assumed that the preset threshold value is 0.1. Since 0.14 is greater than 0.1, the processor 130 may select the suggested use rank as the final recommended use rank in the suggestion information.

In some embodiments, the difference parameter between the actual equipment energy efficiency of each equipment and the predicted energy efficiency may be a standard deviation of the rank index difference corresponding to each equipment. Taking table 4 as an example to continue the description, the processor 130 may obtain a standard deviation of the four rank index differences in table 4 as 0.258. It is assumed that the preset threshold value is 0.2. Since 0.258 is greater than 0.2, the processor 130 may select the suggested use rank as the final recommended use rank in the suggestion information.

Figure 5:
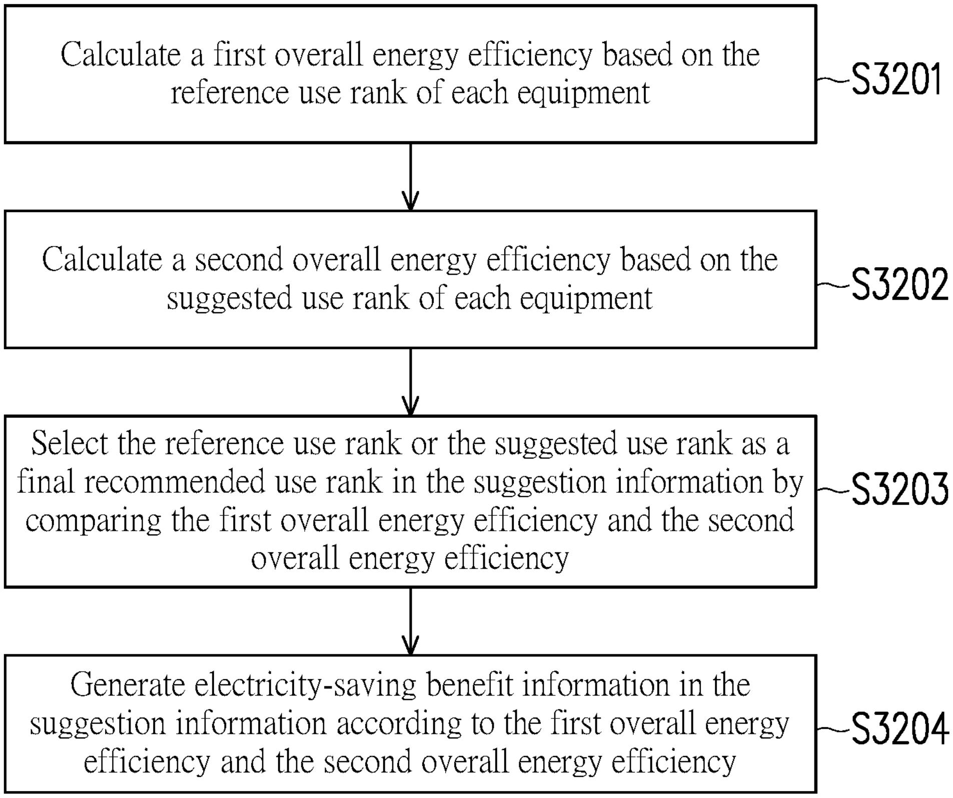
FIG. 5 is a flowchart of generating suggestion information according to an embodiment of the disclosure.

Moreover, in some embodiments, the processor 130 may also calculate an overall performance according to the reference use rank and the suggested use rank, so as to determine the final recommended use rank according to the overall performance corresponding to the reference use rank and the overall performance corresponding to the suggested use rank. In detail, referring to FIG. 5, FIG. 5 is a flowchart of generating suggestion information according to an embodiment of the disclosure. In the embodiment of FIG. 5, step S320 may be implemented as step S3201 to step S3204. In order to clearly illustrate the disclosure, an example will be described in which a total number of the equipment is equal to 4 and a number of turned-on equipment is equal to 3.

In step S3201, the processor 130 may calculate a first overall energy efficiency based on the reference use rank of each equipment. The processor 130 may select a part of the equipment from the plurality of equipment according to the number of turned-on equipment and the reference use rank. The processor 130 may select 3 selected equipment from the 4 equipment according to the reference use rank, and calculate the first overall energy efficiency corresponding to the reference use rank according to the idling rates or equipment availabilities of the 3 selected equipment.

In step S3202, the processor 130 may calculate a second overall energy efficiency based on the suggested use rank of each equipment. Similarly, the processor 130 may select a part of the equipment from the plurality of equipment according to the number of turned-on equipment and the suggested use rank. The processor 130 may select 3 selected equipment from the 4 equipment according to the suggested use rank, and calculate the second overall energy efficiency corresponding to the suggested use rank according to the idling rates or equipment availabilities of the 3 selected equipment.

For example, taking table 3 as an example to continue the description, it is assumed that the current unit time period is 15:00. Table 5 lists previous hour actual equipment energy efficiencies, idling data (i.e., idling rates) of the 4 equipment, and actual displacement volumes (i.e., output data) and electricity consumption per unit time of the 4 equipment.

TABLE 5

| Equipment | Previous unit time period | Previous hour actual equipment energy efficiency | Idling rate | Equipment availability | Actual displacement volume | Electricity consumption per unit time |
|---|---|---|---|---|---|---|
| Equipment #1 | 14:00 | 10.2 | 0.03 | 0.12 | 2500 | 245 |
| Equipment #2 | 14:00 | 9.5 | 0.21 | 0.10 | 2700 | 284 |
| Equipment #3 | 14:00 | 8.2 | 0.05 | 0.05 | 2400 | 293 |
| Equipment #4 | 14:00 | 9.0 | 0.02 | 0.03 | 1425 | 158 |

When the processor 130 selects according to the reference use rank, the processor 130 may select the equipment #1, the equipment #2, and the equipment #4, and calculate the first overall performance according to data of the equipment #1, the equipment #2, and the equipment #4. Since the idling rate may affect the displacement volume and the equipment availability may affect the displacement volume and the electricity consumption, the processor 130 may calculate the first overall performance as 8.55−[2500*(1−0.03−0.12)+2700*(1−0.21−0.10)+2500*(1−0.02−0.03)]/[245*(1−0.12)+284*(1−0.10)+158*(1−0.03)].

When the processor 130 selects according to the suggested use rank, the processor 130 may select the equipment #1, the equipment #3, and the equipment #4 and calculate the second overall performance according to data of the equipment #1, the equipment #3 and the equipment #4. Since the idling rate may affect the displacement volume and the equipment availability may affect the displacement volume and electricity consumption, the processor 130 may calculate the second overall performance as 8.71=[2500*(1−0.03−0.12)+2400*(1−0.05−0.05)+2500*(1−0.02−0.03)]/[245*(1−0.12)+293*(1−0.05)+158*(1−0.03)].

Then, in step S3203, the processor 130 may select the reference use rank or the suggested use rank as the final recommended use rank in the suggestion information by comparing the first overall energy efficiency and the second overall energy efficiency. When the first overall energy efficiency is greater than the second overall energy efficiency, the processor 130 selects the reference use rank as the final recommended use rank in the suggestion information. When the second overall energy efficiency is greater than the first overall energy efficiency, the processor 130 selects the suggested use rank as the final recommended use rank in the suggestion information. Taking table 5 as an example, since the second overall energy efficiency "8.71" is greater than the first overall energy efficiency "8.55", the processor 130 selects the suggested use rank as the final recommended use rank in the suggestion information. Therefore, the equipment manager may decide to use the equipment #1, the equipment #3, and the equipment #4 with reference to the final recommended use rank.

In step S3204, the processor 130 may generate electricity-saving benefit information in the suggestion information according to the first overall energy efficiency and the second overall energy efficiency. The processor 130 may calculate an overall energy efficiency difference according to the first overall energy efficiency and the second overall energy efficiency. The overall energy efficiency difference is a difference between the first overall energy efficiency and the second overall energy efficiency divided by the first overall energy efficiency. Taking table 5 as an example, the overall energy efficiency difference is (8.71−8.55)/8.55=1.87%. Then, the processor 130 may calculate the electricity-saving benefit information according to the rated powers of the equipment #1, the equipment #3, and the equipment #4, an electricity charge rate, a unit time period length, and the overall energy efficiency difference. Taking table 5 as an example, it is assumed that the rated powers of the equipment #1, the equipment #3, and the equipment #4 are respectively 250, 300, and 150, and assumed that the electricity charge rate is 0.8 dollar per kWh and the unit time period length is 1 hour, the processor 130 may calculate the electricity-saving benefit information as (250+300+150)*0.8*1*1.87%=10.5 (dollars). Namely, compared with the situation of selecting the equipment according to the reference use rank, to select the equipment according to the suggested use rank may save 10.5 dollars.

In step S322, the processor 130 may display suggestion information associated with the suggested use rank of each equipment via the display 110. The display 110 may display an equipment recommendation interface, and the equipment recommendation interface may present suggestion information associated with the suggested use rank of each equipment. The suggested information may include the final recommended use rank, the suggested use rank, the electricity-saving benefit information, etc.

Figure 6:
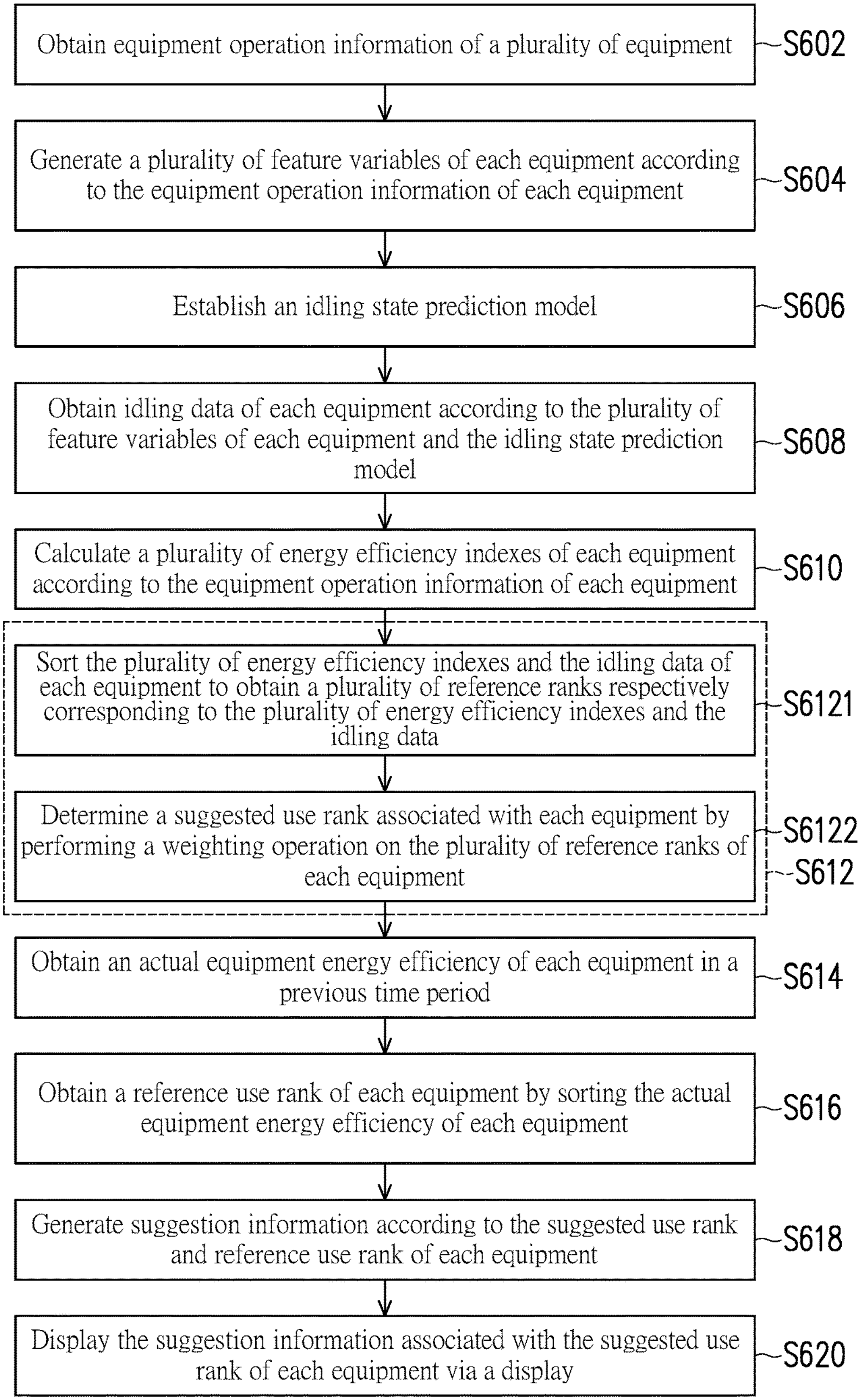
FIG. 6 is a flowchart of an equipment recommendation method according to an embodiment of the disclosure.

FIG. 6 is a flowchart of an equipment recommendation method according to an embodiment of the disclosure. Referring to FIG. 1 and FIG. 6, the method of the embodiment is applicable to the electronic device 100 in the above-mentioned embodiment, and detailed steps of the equipment recommendation method in the embodiment will be described below with reference of various components in the electronic device 100.

In step S602, the processor 130 may obtain equipment operation information of a plurality of equipment. In step S604, the processor 130 may generate a plurality of feature variables of each equipment according to the equipment operation information of each equipment. In step S606, the processor 130 may establish an idling state prediction model. In step S608, the processor 130 may obtain idling data of each equipment according to the plurality of feature variables of each equipment and the idling state prediction model. In step S610, the processor 130 may calculate a plurality of energy efficiency indexes of each equipment according to the equipment operation information of each equipment. For detailed operations of step S602 to step S610, reference may be made to the description of the embodiment in FIG. 2 and the embodiment in FIG. 3, which will not be repeated here.

In step S612, the processor 130 may determine a suggested use rank of each equipment according to the plurality of energy efficiency indexes and idling data of each equipment. It should be noted that, different from the embodiment shown in FIG. 3, the processor 130 may determine the suggested use rank of each equipment according to a plurality of reference ranks respectively corresponding to the plurality of energy efficiency indexes and idling data. In detail, step S612 may be implemented as step S6121 and step S6122.

In step S6121, the processor 130 may sort the plurality of energy efficiency indexes and idling data of each equipment to obtain the plurality of reference ranks respectively corresponding to the plurality of energy efficiency indexes and idling data. In detail, the processor 130 may sort the idling data of each equipment to obtain the reference rank corresponding to the idling data of each equipment. The processor 130 may sort a certain energy efficiency index of each equipment to obtain another reference rank corresponding to the energy efficiency index of each equipment.

In step S6122, the processor 130 may determine a suggested use rank associated with each equipment by performing a weighting operation on the plurality of reference ranks of each equipment. In detail, the plurality of energy efficiency indexes and idling data may each correspond to a weight. The processor 130 may respectively multiply the plurality of energy efficiency indexes and idling data of a certain equipment by corresponding weights and then add them together to obtain the suggested use rank of the equipment. The processor 130 may perform a similar weighting operation on each equipment, so as to obtain the suggested use rank of each equipment.

For example, table 6 lists the reference ranks of a plurality of energy efficiency indexes and idling rates of 4 equipment. It is assumed that these energy efficiency indexes and the idling rates each correspond to a same weight value of 0.25, the processor 130 may calculate the suggested use rank of each equipment according to the plurality of reference ranks corresponding to each equipment. For example, the processor 130 may calculate the suggested use rank of the equipment #1 as 2.25=2*0.25+2*0.25+1*0.25+4*0.25. The processor 130 may calculate the suggested use rank of the equipment #2 as 3=3*0.25+4*0.25+3*0.25+2*0.25, and so on and so forth. However, the weight value may be set according to an actual application, which is not limited by the disclosure.

TABLE 6

| Equipment | Unit time period | Previous hour actual equipment energy efficiency (reference rank) | Output compliance rate (reference rank) | Idling rate (reference rank) | Equipment availability (reference rank) | Suggested use rank |
|---|---|---|---|---|---|---|
| Equipment #1 | 15:00 | 10.2(2) | 0.98(2) | 0.02(1) | 0.03(4) | 2.25 |
| Equipment #2 | 15:00 | 10.0(3) | 0.78(4) | 0.05(3) | 0.10(2) | 3 |
| Equipment #3 | 15:00 | 10.9(1) | 0.99(1) | 0.03(2) | 0.12(1) | 1.25 |
| Equipment #4 | 15:00 | 9.2(4) | 0.84(3) | 0.21(4) | 0.05(3) | 3.5 |

In step S614, the processor 130 may acquire an actual equipment energy efficiency of each equipment in a previous time period. In step S616, the processor 130 may obtain a reference use rank of each equipment by sorting the actual equipment energy efficiency of each equipment. In step S618, the processor 130 may generate suggestion information based on the suggested use rank and reference use rank of each equipment. In step S620, the processor 130 may display the suggestion information associated with to the suggested use rank of each equipment via the display 110. For detailed operations of step S614 to step S620, reference may be made to the descriptions of the embodiment of FIG. 2 and the embodiment of FIG. 3, which are not repeated here.

Figure 7:
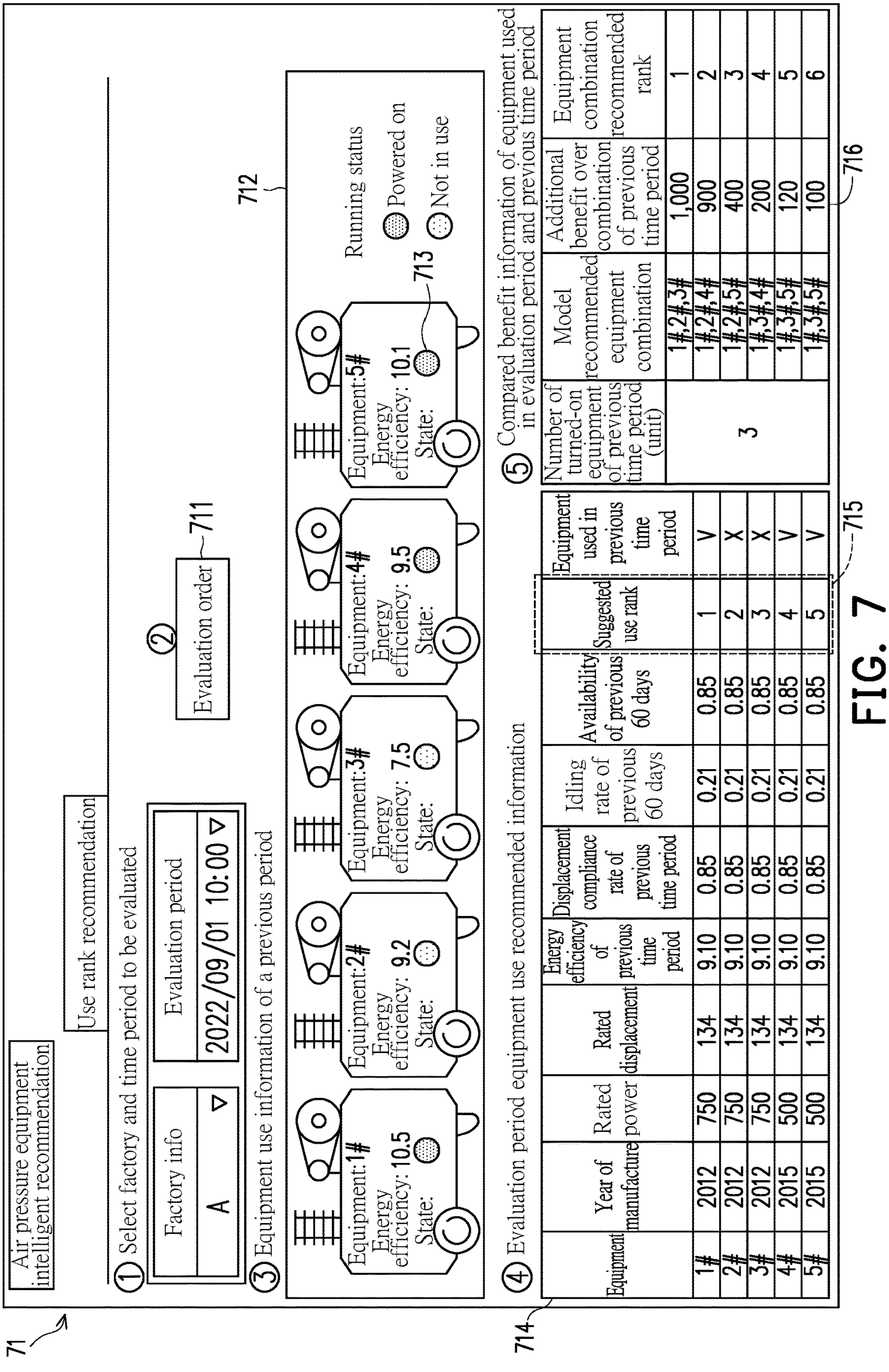
FIG. 7 is a schematic diagram of an operation interface of suggestion information according to an embodiment of the disclosure.

FIG. 7 is a schematic diagram of an operation interface of suggestion information according to an embodiment of the disclosure. Referring to FIG. 7, the display 110 may display an equipment recommendation interface 71. A manager may click on an option 711 of the equipment recommendation interface 71 to trigger the operation of the processor 130 according to the above-mentioned embodiment to generate the suggestion information associated with the suggested use rank of each equipment, and display the suggestion information on the equipment recommendation interface 71. A field 712 displays actual energy efficiencies of a previous time period of five equipment, and a prompt symbol (for example, a prompt symbol 713) indicating whether the equipment was powered on for usage in the previous time period. A field 714 shows idling data, energy efficiency indexes, equipment specification information and suggested use ranks 715 of 5 equipment. A field 716 shows the electricity-saving benefit information of the used equipment #1, equipment #4, and equipment #5 of the previous time period.

An embodiment of the disclosure further provides a non-transitory computer readable recording medium. The non-transitory computer readable recording medium stores a program, and when a computer loads the program and executes the program, it may complete the technical contents of the above-mentioned embodiments.

A processing procedure of the equipment recommendation method executed by at least one processor is not limited to the example of the above-mentioned embodiment. For example, a part of the steps (processing) described above may be omitted, and each step may be performed in another order. In addition, any two or more of the above steps may be combined, and a part of the steps may be corrected or deleted. Alternatively, other steps may also be performed in addition to the above steps.

In summary, in the embodiment of the disclosure, the idling data of each equipment may be obtained according to the equipment operation information of multiple equipment and the trained machine learning model, and the suggested use rank of each equipment may be determined according to the idling data of each equipment. Since the suggested use rank of each equipment is generated with consideration of the idling data, the use ranks of the equipment may be effectively optimized for the purpose of energy saving. In this way, the energy wasted by idling equipment may be effectively reduced, so as to save electricity and reduce factory costs.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An equipment recommendation method, comprising:

generating a plurality of feature variables of each of a plurality of equipment according to equipment operation information of the plurality of equipment;

obtaining idling data of each of the plurality of equipment according to the feature variables of each of the plurality of equipment and an idling state prediction model, wherein the idling state prediction model is a machine learning model and configured to identify whether each of the plurality of equipment is operating in an idling state or a non-idling state;

calculating a plurality of energy efficiency indexes of each of the plurality of equipment according to the equipment operation information of each of the plurality of equipment;

determining a suggested use rank of each of the plurality of equipment according to the plurality of energy efficiency indexes and the idling data of each of the plurality of equipment; and displaying suggestion information associated with the suggested use rank of each of the plurality of equipment via a display, wherein the method further comprises:

generating the plurality of feature variables corresponding to a plurality of training unit time periods according to the equipment operation information of at least one of the plurality of equipment;

labeling each of the plurality of training unit time periods as the idling state or the non-idling state by comparing at least one of the plurality of feature variables with a preset threshold; and training the idling state prediction model by using the plurality of feature variables of each of the plurality of training unit time periods and a labeling result of each of the plurality of training unit time periods.

2. The equipment recommendation method according to claim 1, wherein the step of obtaining the idling data of each of the plurality of equipment according to the feature variables of each of the plurality of equipment and the idling state prediction model comprises:

inputting the plurality of feature variables corresponding to a plurality of unit time periods into the idling state prediction model to obtain a plurality of predicted idling states corresponding to the plurality of unit time periods; and calculating an idling rate of each of the plurality of equipment according to the plurality of predicted idling states corresponding to the plurality of unit time periods.

3. The equipment recommendation method according to claim 2, wherein the step of calculating the idling rate of each of the plurality of equipment according to the plurality of predicted idling states corresponding to the plurality of unit time periods comprises:

calculating an idling time according to the plurality of predicted idling states corresponding to the plurality of unit time periods within a statistical time period; and calculating the idling rate according to the idling time and the statistical time period.

4. The equipment recommendation method according to claim 1, wherein the step of determining the suggested use rank of each of the plurality of equipment according to the plurality of energy efficiency indexes and the idling data of each of the plurality of equipment comprises:

sorting the plurality of energy efficiency indexes and the idling data of each of the plurality of equipment to obtain a plurality of reference ranks respectively corresponding to the plurality of energy efficiency indexes and the idling data; and determining the suggested use rank associated with each of the plurality of equipment by performing a weighting operation on the plurality of reference ranks of each of the plurality of equipment.

5. The equipment recommendation method according to claim 1, wherein the step of determining the suggested use rank of each of the plurality of equipment according to the plurality of energy efficiency indexes and the idling data of each of the plurality of equipment comprises:

predicting a predicted energy efficiency of each of the plurality of equipment by inputting the plurality of energy efficiency indexes and the idling data of each of the plurality of equipment into an energy efficiency prediction model, wherein the energy efficiency prediction model is a machine learning model; and determining the suggested use rank of each of the plurality of equipment by sorting the predicted energy efficiency of each of the plurality of equipment.

6. The equipment recommendation method according to claim 1, further comprising:

obtaining an actual equipment energy efficiency of each of the plurality of equipment in a previous time period according to output data and electricity consumption of each of the plurality of equipment in the previous time period;

obtaining a reference use rank of each of the plurality of equipment by sorting the actual equipment energy efficiency of each of the plurality of equipment; and generating the suggestion information according to the suggested use rank and the reference use rank of each of the plurality of equipment.

7. The equipment recommendation method according to claim 6, wherein the step of generating the suggestion information according to the suggested use rank and the reference use rank of each of the plurality of equipment comprises:

selecting the reference use rank or the suggested use rank as a final recommended use rank in the suggestion information according to a difference parameter between the actual equipment energy efficiency and the predicted energy efficiency of each of the plurality of equipment.

8. The equipment recommendation method according to claim 6, wherein the step of generating the suggestion information according to the suggested use rank and the reference use rank of each of the plurality of equipment comprises:

calculating a first overall energy efficiency based on the reference use rank of each of the plurality of equipment;

calculating a second overall energy efficiency based on the suggested use rank of each of the plurality of equipment; and selecting the reference use rank or the suggested use rank as a final recommended use rank in the suggestion information by comparing the first overall energy efficiency and the second overall energy efficiency.

9. The equipment recommendation method according to claim 8, wherein the step of generating the suggestion information according to the suggested use rank and the reference use rank of each of the plurality of equipment further comprises:

generating electricity-saving benefit information in the suggestion information according to the first overall energy efficiency and the second overall energy efficiency.

10. An electronic device, comprising:

a display;

a storage circuit, storing a plurality of instructions;

a processor, coupled to the display and the storage circuit, and accessing the instructions to:

generate a plurality of feature variables of each of a plurality of equipment according to equipment operation information of the plurality of equipment;

obtain idling data of each of the plurality of equipment according to the feature variables of each of the plurality of equipment and an idling state prediction model, wherein the idling state prediction model is a machine learning model and configured to identify whether each of the plurality of equipment is operating in an idling state or a non-idling state;

calculate a plurality of energy efficiency indexes of each of the plurality of equipment according to the equipment operation information of each of the plurality of equipment;

determine a suggested use rank of each of the plurality of equipment according to the plurality of energy efficiency indexes and the idling data of each of the plurality of equipment; and display suggestion information associated with the suggested use rank of each of the plurality of equipment via the display, wherein the processor further:

generates the plurality of feature variables corresponding to a plurality of training unit time periods according to the equipment operation information of at least one of the plurality of equipment;

labels each of the plurality of training unit time periods as the idling state or the non-idling state by comparing at least one of the plurality of feature variables with a preset threshold; and trains the idling state prediction model by using the plurality of feature variables of each of the plurality of training unit time periods and a labeling result of each of the plurality of training unit time periods.

11. The electronic device according to claim 10, wherein the processor further:

inputs the plurality of feature variables corresponding to a plurality of unit time periods into the idling state prediction model to obtain a plurality of predicted idling states corresponding to the plurality of unit time periods; and calculates an idling rate of each of the plurality of equipment according to the plurality of predicted idling states corresponding to the plurality of unit time periods.

12. The electronic device according to claim 11, wherein the processor further:

calculates an idling time according to the plurality of predicted idling states corresponding to the plurality of unit time periods within a statistical time period; and calculates the idling rate according to the idling time and the statistical time period.

13. The electronic device according to claim 10, wherein the processor further:

sorts the plurality of energy efficiency indexes and the idling data of each of the plurality of equipment to obtain a plurality of reference ranks respectively corresponding to the plurality of energy efficiency indexes and the idling data; and determines the suggested use rank associated with each of the plurality of equipment by performing a weighting operation on the plurality of reference ranks of each of the plurality of equipment.

14. The electronic device according to claim 10, wherein the processor further:

predicts a predicted energy efficiency of each of the plurality of equipment by inputting the plurality of energy efficiency indexes and the idling data of each of the plurality of equipment into an energy efficiency prediction model, wherein the energy efficiency prediction model is a machine learning model; and determines the suggested use rank of each of the plurality of equipment by sorting the predicted energy efficiency of each of the plurality of equipment.

15. The electronic device according to claim 10, wherein the processor further:

obtains an actual equipment energy efficiency of each of the plurality of equipment in a previous time period according to output data and electricity consumption of each of the plurality of equipment in the previous time period;

obtains a reference use rank of each of the plurality of equipment by sorting the actual equipment energy efficiency of each of the plurality of equipment; and generates the suggestion information according to the suggested use rank and the reference use rank of each of the plurality of equipment.

16. The electronic device according to claim 15, wherein the processor further:

selects the reference use rank or the suggested use rank as a final recommended use rank in the suggestion information according to a difference parameter between the actual equipment energy efficiency and the predicted energy efficiency of each of the plurality of equipment.

17. The electronic device according to claim 15, wherein the processor further:

calculates a first overall energy efficiency based on the reference use rank of each of the plurality of equipment;

calculates a second overall energy efficiency based on the suggested use rank of each of the plurality of equipment;

selects the reference use rank or the suggested use rank as a final recommended use rank in the suggestion information by comparing the first overall energy efficiency and the second overall energy efficiency; and generates electricity-saving benefit information in the suggestion information according to the first overall energy efficiency and the second overall energy efficiency.

18. A non-transitory computer readable recording medium storing a program, in response to a computer loading and executing the program, the recording medium generating a plurality of feature variables of each of a plurality of equipment according to equipment operation information of the plurality of equipment; obtaining idling data of each of the plurality of equipment according to the feature variables of each of the plurality of equipment and an idling state prediction model, wherein the idling state prediction model is a machine learning model and configured to identify whether each of the plurality of equipment is operating in an idling state or a non-idling state; calculating a plurality of energy efficiency indexes of each of the plurality of equipment according to the equipment operation information of each of the plurality of equipment; determining a suggested use rank of each of the plurality of equipment according to the plurality of energy efficiency indexes and the idling data of each of the plurality of equipment; and displaying suggestion information associated with the suggested use rank of each of the plurality of equipment via a display, wherein the recording medium further generating the plurality of feature variables corresponding to a plurality of training unit time periods according to the equipment operation information of at least one of the plurality of equipment; labeling each of the plurality of training unit time periods as the idling state or the non-idling state by comparing at least one of the plurality of feature variables with a preset threshold; and training the idling state prediction model by using the plurality of feature variables of each of the plurality of training unit time periods and a labeling result of each of the plurality of training unit time periods.

* * * * *